United States Patent [19]

Menzies

[11] 3,970,496
[45] July 20, 1976

[54] MANUFACTURE OF LAMINATES OF SHEET METAL, POLYTHENE AND ALUMINIUM FOIL

[75] Inventor: John Ian Menzies, Brisbane, Australia

[73] Assignee: Heatshield Research and Development Pty. Ltd., Oxley, Australia

[22] Filed: Oct. 10, 1974

[21] Appl. No.: 513,722

[30] Foreign Application Priority Data
Oct. 10, 1973  Australia............................ 5167/73

[52] U.S. Cl............................... 156/162; 156/191; 156/309; 156/311; 156/499
[51] Int. Cl.² ........................................ B31C 13/00
[58] Field of Search ........... 156/162, 191, 309, 311, 156/324, 499

[56] References Cited
UNITED STATES PATENTS

| | | | |
|---|---|---|---|
| 3,647,617 | 3/1972 | Rieke et al. | 156/324 |
| 3,712,849 | 1/1973 | Robbiati | 156/324 |
| 3,721,597 | 3/1973 | Colburn | 156/309 |
| 3,725,169 | 4/1973 | Allen et al. | 156/309 |
| 3,767,500 | 10/1973 | Tally et al. | 156/309 |

Primary Examiner—Douglas J. Drummond
Assistant Examiner—Brian J. Leitten
Attorney, Agent, or Firm—Donald D. Jeffery

[57] ABSTRACT

A metallic laminate of the type comprising sheet metal, such as galvanized sheet steel, and aluminium foil, with an interposed thermoplastic, such as polyethylene, which, under heat and pressure, adheres to the foil and sheet metal, has its bond strength substantially increased winding it as a coil under tension, the laminate being heated, before and/or after coiling. Subsequently the coil, while clamped radially to prevent relative movement of the coil convolutions, is cooled from the outside, the coiling under tension, the heating and the cooling all causing inter-layer pressures in the coil which, with the heat, bring about a useful increase in the bond strength.

9 Claims, 5 Drawing Figures

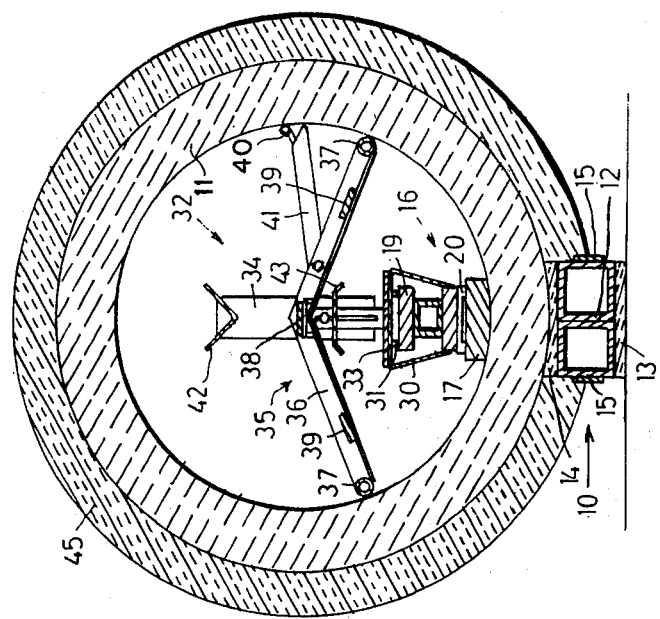
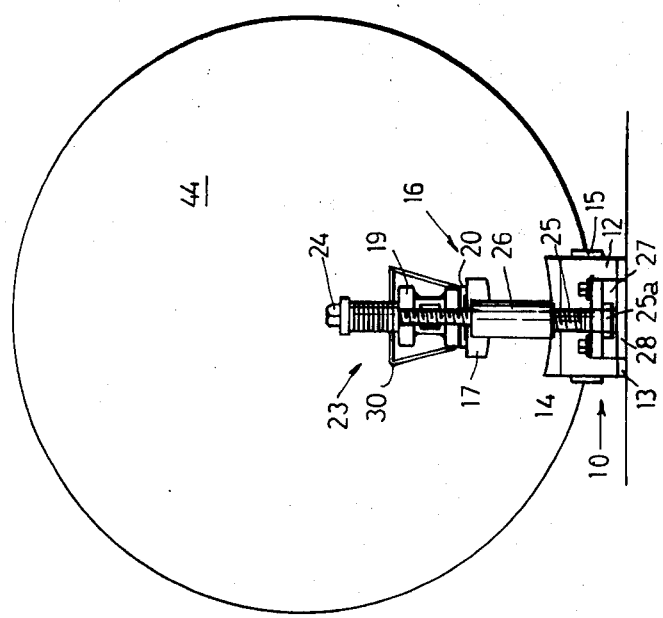

MANUFACTURE OF LAMINATES OF SHEET METAL, POLYTHENE AND ALUMINIUM FOIL

BACKGROUND OF THE INVENTION

This invention relates to metallic laminates, more particularly those in which the metallic layers are bonded by a thermoplastic adhesive.

It is known to make a laminate (hereinafter called a laminate of the type described) comprising sheet metal, such as galvanized sheet steel, and aluminium foil, with an interposed thermoplastic adhesive which, under the application of heat and pressure, adheres to the foil and sheet metal. The laminated product may be roll-formed to desired profile for roofing or wall cladding and, when erected on structures with the aluminium foil facing inwards, it has good heat insulating properties because of the low emission of radiant heat from the aluminium foil surface. The thermoplastic adhesive employed may be polyethylene, with or without additives, and hereinafter called "polythene".

A laminate of the type described may have metallic foil likewise adhered to the second side of the sheet metal so that, when used in a structure, this second metal foil layer faces outwards, for improved weathering, appearance and/or reflection of heat, and this second layer of foil may be of aluminium or any other suitable metal.

A difficulty in the manufacture of a laminate of the type described is in obtaining a sufficiently good bond strength within the laminate to enable roll-forming to be carried out satisfactorily and to minimise subsequent damage in the handling and application of the laminate.

BRIEF SUMMARY OF THE INVENTION.

The general object of this invention is to provide a method and apparatus for very significantly improving the bond strength of such a laminate.

Accordingly, the invention resides broadly, in one aspect, in a method of increasing the bond strength of a laminate of the type described including the steps of assembling the laminate as a coil held under tension of at least 1,000 pounds per square inch of cross-section of the laminate, and at a temperature of at least 125°C at the coolest part of the coil, and cooling the coil, to bring its hottest part below 100°C, the cooling, at least between 150°C and 100°C, being such that, of succeeding convolutions of the coil, that of greater diameter is of lower temperature than that of lesser diameter. Preferably the laminate is heated before being wound on a cooler mandrel, from which it is subsequently removed, and has a radial section clamped to restrain the convolutions of the coil from movement relative to each other, the coil then being enclosed in a heat insulating jacket and heated, from inside, to the temperature of at least 125°C.

In another aspect, the invention resides broadly in apparatus for use in increasing the bond strength of the laminate including a coil support assembly to support a coil of the laminate wound under tension, a coil holding beam for fitting through the coil above the coil support assembly, means for applying load to the ends of the coil holding beam to clamp the bottom part of the coil to prevent unwinding thereof, heating means for fitting within the coil to heat the coil from the inside thereof, and a heat insulating jacket for application to the coil.

Other features of the invention will become apparent from the following description.

BRIEF DESCRIPTION OF THE DRAWINGS.

In the drawings:

FIG. 2 is an elevation of the apparatus,

FIG. 3 is a sectional view along 3—3 in FIG. 1,

DETAILED DESCRIPTION OF THE PREFERRED EMBODIMENT OF THE INVENTION

Figure 1:
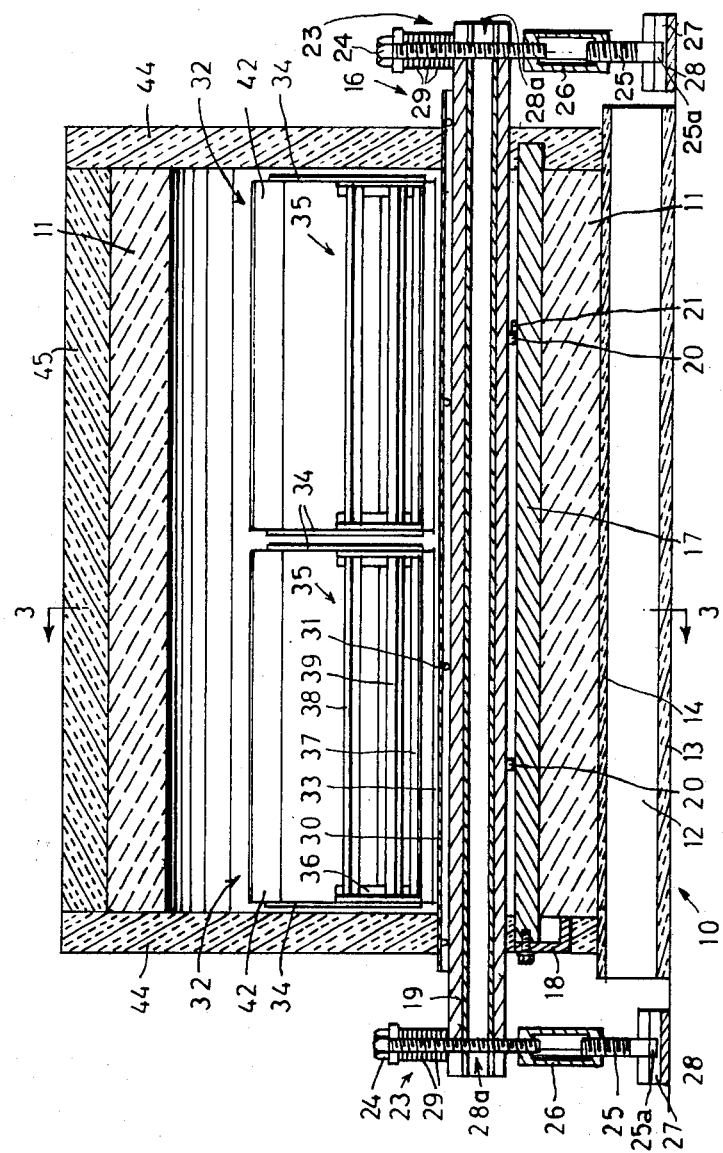
FIG. 1 is a longitudinal sectional view of apparatus according to the invention, for curing a metallic laminate of the type described.

A laminate of the type described is assembled in a machine of known type, in which galvanized sheet steel from a coil at one end of the machine is drawn through the machine, substantially horizontally, by being wound upon the driven mandrel of a coiler at the other end of the machine. Polythene film from a second roll is brought down to the moving sheet steel and superimposed thereon, and aluminium foil is drawn from a third roll, has a thin film of lubricant applied to one face and has its other face brought down onto the polythene. The assembly comprising a sheet of steel and a sheet of alumininium foil with an interposed sheet of polythene is drawn under a pressure pad and under a flexibly weighted glass cloth pad and, at the same time, over a parallel transverse series of gas jets which heat the sheet steel. By conduction, the heat and pressure cause the polythene to adhere to the steel and foil. Braking means are applied to the sheet steel before the polythene and foil are superimposed thereon, to ensure that the laminate is coiled on the mandrel under predetermined tension, and to this end, the laminate should be wound on the mandrel under tension of at least 1,000 pounds per square inch of cross-section of the laminate.

A typical temperature of the laminate immediately after leaving the gas jets is 225°C, and the temperature of the laminate immediately before being wound on the mandrel may be about 185°C. Heat loss in the laminate between the gas jets and the mandrel may be reduced by passing the laminate around a roller of large heat capacity and which is heated by gas jets.

According to the present invention, the mandrel, if below 70°C before coiling, should preferably be heated to at least this temperture in any suitable way, but should be of a temperature at least 25°C lower than that of the laminate immediately prior to being wound on the mandrel. When the coil of laminate is wound upon the mandrel, then, the initial layers of the coil are cooled rapidly. As the coil diameter increases, the outer layers continue to be cooled but to a continuously decreasing amount because the mandrel and the inner turns of the coil are being heated by the outer layers. Therefore, when the laminate has been fully coiled, the temperature of the inner layers is higher than it was when those layers were wound on the coil. A typical outer layer temperature for a nearly completed coil is 70°C and the inside temperature of a just-completed coil is typically 100°C. This increase in the temperature of the inner layers of the coil causes a thermal expansion thereof, tending to cause a corresponding increase in diameter which is resisted by the outer layers of the coil, so that there is brought about an increase in the inter-layer pressure within the coil.

If the coil were to be cooled to a uniform temperture the diameter of each layer of the coil would tend to decrease by a proportion dependent on the amount that layer was cooled. The outer layers, then, would tend to contract by a higher proportion than would the inner layers, because they would be cooled through a greater temperature range. This differential contraction tendency would result in the interlayer pressure in the coil being retained. Similarly, this inter-layer pressure would exist if the coil were brought to any uniform temperature throughout; and it is additional, of course, to the pressure brought about by the drawing of the laminate, under tension, onto the rotating driven mandrel.

It has been found that the bond strength within the laminate is very materially improved by the effects of heat and pressure consequent upon maintaining the coiled laminate at a predetermined temperature for a predetermined period, this process being referred to herein as "curing" of the laminate.

The bond strength of the laminate may be measured by making parallel cuts spaced by a predetermined distance, say one inch, through the foil and adhesive laminations of a section of the product, separating the foil strip so defined from the sheet metal, and applying force to this strip, in a direction normal to the sheet metal lamination until the bond is broken and the strip commences to tear away from the sheet metal, the force required to break the bond being expressed in terms of ounces per inch width. A minimum useful increase in bond strength is taken to be an increase between one and two ounces per inch width.

The completed coil of the laminate is strapped, and it is then withdrawn from its mandrel. The interior of the coil, that is to say the inner surface of the innermost turn of the coiled laminate, is blackened by the application of any suitable matt black paint. The coil is then transported to and mounted on the apparatus shown in FIGS. 1 to 3, to which reference is now made.

The apparatus includes a coil support assembly 10, on which the coil 11 is supported. This assembly consists of a coil support beam 12 supported upon a base pad 13 of heat insulating material such as asbestos, and upon which is an upper pad 14 of heat insulating material such as a number of superimposed sheets of fibreglass cloth, upon which the coil 11 rests. Thermostatically controlled heating elements 15 are applied to both sides of the coil support beam 12 for a purpose hereinafter explained.

A coil holding assembly 16 is placed through the coil 11, and includes a coil holding beam 17, located on the bottom of the interior of the coil, directly above a parallel to the coil support beam 12, the bottom of the beam 17 being radiused correspondingly to the interior of the coil. A stop bracket 18 on one end of the beam 17 is brought against one end of the coil 11, ensuring correct longitudinal disposition of the coil holding beam.

A loading beam 19 is inserted slidably through the coil 11 above the coil holding beam 17. The beam 19 is of composite construction, with rectangular-section upper and lower members welded to a box-section intermediate member. Transverse contact ribs 20 secured under the loading beam 19 bear on the coil holding beam 17, one of these ribs being brought against a stop 21 on the coil holding beam correctly locating the loading beam.

Adjustable load applicators 23 are provided to apply constant equal loads to both ends of the loading beam 19. In each of the load applicators, an upper bolt 24 and a lower bolt 25 are engaged with a turnbuckle nut 26, a cross-head 25a of the lower bolt 25 being slidably engaged in a longitudinal T-section slot 27 in a floor plate 28 bolted to the floor, the upper bolt 24, above the turnbuckle nut, being engaged in a longitudinal slot 28a formed from the end of the loading beam 18. Above the beam 19, a series of superimposed annular springs 29 are engaged on the bolt 24. By adjustment of the turnbuckle nuts 26 and upper bolts 24 of both load applicators 23, predetermined loads may be applied to both ends of the loading beam 19. By measurement of the length of the series of springs 29 of the two load applicators, equal loads of a predetermined value may be applied to both ends of the beam 19, to be transferred, through the coil holding beam 17, to the bottom part of the coil 11. In this manner, a load of the order of 10,000 lb. is applied to the coil to clamp it between the coil holding beam 17 and the pad 14 of the coil support assembly 10, to restrain the convolutions of the coil from movement relative to each other.

Fitted over the major central part of the loading beam 19 is a reflective cover channel 30 of sheet metal, with a horizontal top held above the beam 19 by spacers 31, and sides downwardly convergent to contact the sides of the lower member of the beam 19.

Two coil heating assemblies 32 are installed end-to-end within the coil 11. Each of these assemblies has a base plate 33 which is supported by the loading beam cover 30, and a pair of vertically adjustable standards 34 extending up from the ends of the base plate to support a carrier frame 35. The carrier frame includes a pair of inverted-V-shaped arms 36, inclining downwardly and outwardly to both sides of the standards, the extremities of the two arms being interconnected by longitudinal tubes 37 which bear against the interior of the coil 11 and are thermally insulated in any suitable way. A central element 38 and two side heating elements 39 extend longitudinally of each coil heating assembly 32, being supported at their ends by the inverted-V-shaped arms 36. The heating elements 38 and 39 of the two coil heating assemblies are controlled by a thermostat 40 associated with one of the assemblies, being carried at one end of an arm 41 which at its other end is pivoted to an inverted-V-shaped arm 36, the thermostat being arranged to lie against the blackened interior surface of the coil 11, and itself having a similarly blackened surface.

The central heating element 38 of each of the coil heating assemblies is located on or close to the axis of the coil 11 and arranged to direct heat, for the main part, upwardly and downwardly. Directly above this element the standards 34 support a V-shaped reflector 42, which deflects radiant heat from the uppermost part of the interior of the coil 11, to compensate for the larger amount of convected heat within this part of the coil. The standards also support, below the central heating element 38, a reflector 43, which deflects radiant heat from the coil holding assembly 16.

The side heating elements 39 are located on or close to planes radiating from the coil axis at angles of 30° below horizontal, and at about two-thirds the radial distance from the coil axis to the interior surface of the coil.

These elements are arranged to cause the major part of the heat radiated therefrom to be normal to the radial lines. The assemblies of heating elements 38 and 39 thus is such as to reduce the likelihood of there being areas of the interior of the coil which are significantly of greater than average temperature.

A heat insulating covering is applied to the coil, this covering consisting of two end sections 44 of material such as fibre-glass insulation, each in the form of a disc of greater diameter than the coil 11, suitably apertured to clear the ends of the coil holding assembly 16 and coil support assembly 10; and a main section 45, of similar material, wrapped about the coil between the end sections 44, and terminating against the sides of the coil support assembly 10.

The coil 11 is now raised to a predetermined curing temperature, hereinafter discussed, by the activation of the coil heating assemblies 32; and the thermostatically controlled heaters 15 are operated to heat the coil support beam 12 to such extent as to balance heat loss from the coil at this position. The heaters are so made and arranged, in conjunction with reflecting and insulating means, that the interior of the coil is heated substantially uniformly.

Since the coil is heated from the inside, the inner turns of the coil are subject to thermal expansion which is resisted by the outer turns of the coil, the temperature differential across the coil causing additional pressure between succeeding convolutions of the coil.

The coil, after being raised to the predetermined curing temperature, is retained at or about this temperature for a predetermined time, as later explained, after which it is allowed to cool progressively from the outer layers inwards. The heating assemblies 32 and the heating element 15 are switched off, and the insulating cover 45 is removed; but the end insulating sections 44 are left in place to avoid heat loss from the ends of the coil which would cause the ends of the coil to contract more than its middle part. Such contraction resisted by the central part of the coil would induce, at the ends of the coil, tension stresses which could cause stretching at the edges of the laminate, and an unacceptable product. To prevent any such stretching, the temperature difference transversely of any turn of the coil should be kept as small as practicable, and at least below 50°C, this applying during the heating of the coil, the time it is held at predetermined temperature, and during subsequent cooling.

The curing time, during which the bond strength of the laminate is augmented, is defined as follows:

a. where, immediately prior to the restraining of the convolutions of the coil from movement relative to each other, the coolest part of the coil has a temperature below 125°C, the curing time is the time from when the coolest part of the coil is raised to 125°C to the time when this part is subsequently cooled to below this temperature; and b. when immediately following the restraint of relative movement of the convolutions of the coil, the temperature of the coolest part of the coil is at or about 125°C, the curing time is the time from the said restraint of the convolutions of the coil to the time at which the coolest part of the coil subsequently reaches a temperature below 125°C during cooling.

Figure 4:
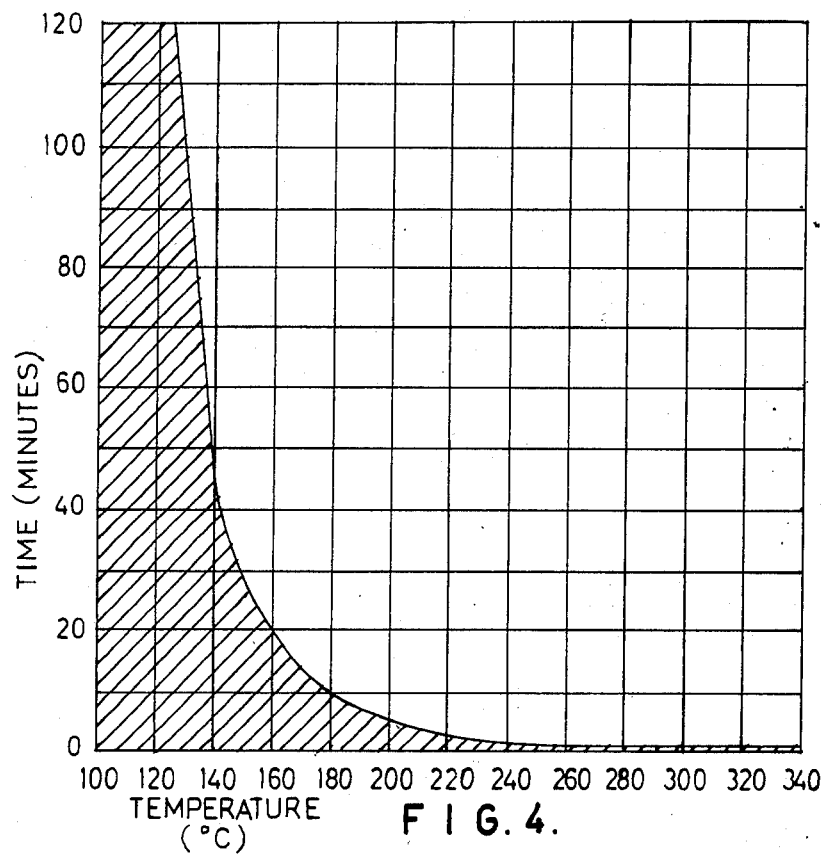
FIG. 4 is a graph showing the relationship between minimum curing time and average curing temperature to give a minimum useful increase in bond strength.

It has been found that a useful increase in bond strength is obtained by coiling the laminate under tension of not less than 1,000 pounds per square inch of the laminate cross-section; holding the coil, as described, to retain the tension and the consequent interlayer pressure; and keeping the coil at a curing temperature which, at the coolest part of the coil is not below 125°C or above 340°C for a curing time not less than two hours at 125°C. This minimum curing time, for a curing temperature of 125°C is, however, progressively decreased with higher curing temperatures, as shown in FIG. 4. The curve on the graph of FIG. 4 is applicable to the coolest part of the coil, as this coolest area will tend to have, after curing, the lowest bond strength. The maximum temperature at any part of the coil at any stage in the curing process preferably does not exceed 350°C, because above this temperature, evaporation of the polythene may adversely affect bond strength.

Since the coil is heated from within, the coolest part of the coil will be the coolest part of its outermost convolution. The curve in the graph of FIG. 4 applies to the average temperature of the coolest part of the outermost turn of the coil during the curing time, this temperature being defined as the average temperature of that part weighted with the time during the curing period that it is actually at each temperature at or above 125°C. In FIG. 4, then, the point on the curve at 200°C for 5.2 minutes represents the average temperature of the coolest part of the outside of the coil over a minimum curing period of 5.2 minutes.

It should be understood that the curve of the graph in FIG. 4 indicates a relationship between curing time and curing temperature which will give a minimum useful increase in bond strength, of between one and two ounces, measured as before described. In experiments which have been carried out, any combination of curing time and curing temperature on the shaded part of the graph resulted in an increase in bond strength of less than one to two ounces, and any combination of curing time and curing temperature on the unshaded part of the graph resulted in an increase in bond strength of one to two ounces or more.

When the coil has been permitted to cool to room temperature, it may be removed from the curing apparatus, after removal of the end insulating sections 44, the withdrawal of the heating assemblies 32, the release of the load applicators 23 and the withdrawal of the loading beam 19 and coil holding beam 17.

The coil, when removed from the curing apparatus, still retains the inter-layer pressure consequent both on the tension under which it was initially wound, and on the temperature differential during coiling, discussed above. As a result, the coil will be very tightly wound, and so less susceptible to damage during storage than would be the case if the pressure were not present. Also, a tight coil may be more readily loaded onto a mandrel for subsequent de-coiling than would be the case with a loose coil.

Figure 5:
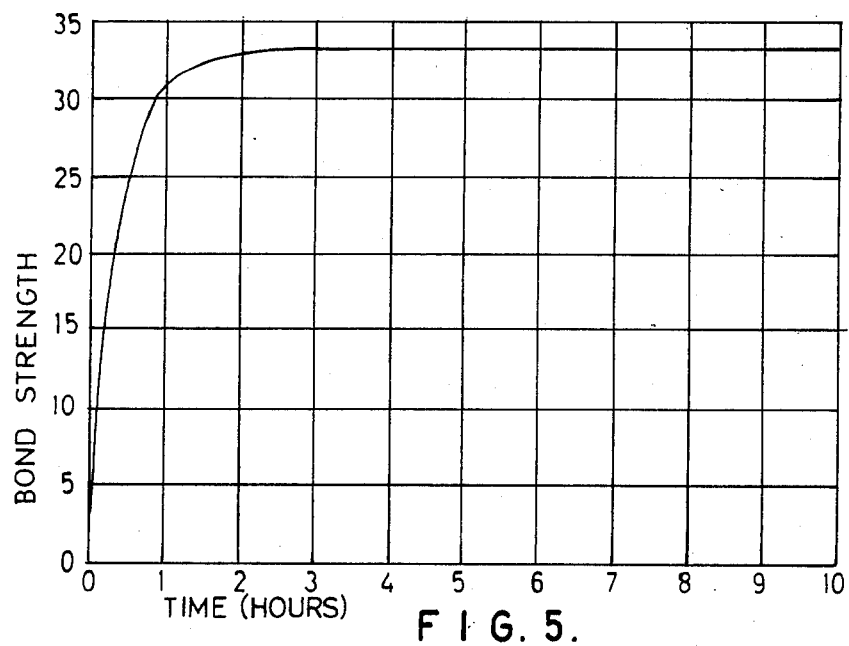
FIG. 5 is a graph in which bond strength measurements are plotted against curing times, in relation to a particular curing temperature.

It is found that very substantial increases in bond strength are obtained from the method above described. In FIG. 5, bond strength measurements have been plotted against curing time, at an average curing temperature of 205°C. Experiments have shown that in a laminate of the type described, cured under given conditions of temperature and pressure, the bond strength of the laminate initially increased rapidly, and then the rate of increase lessened as the bond strength approached an upper limit, as is shown in FIG. 5. The experimental evidence used to plot the curve of FIG. 5, has been found to fit within 5%, the curve shown by equation 1 hereunder $$S = S_1 + S_2 (1 - e^{-At})$$

where $S$ = bond strength of laminate at any time during the curing process, expressed in ounces per inch width,
$S_1$ = 4 ounces per inch width,
$S_2$ = 30 ounces per inch width,
$A$ = 2.3
$t$ = time in hours.

I claim:
1. A method for increasing the bond strength of a bonded laminate of two metallic layers joined by a thermal plastic adhesive, comprising the steps of
   continuously interleaving a web of thermal plastic adhesive between two metal sheets;
   heating at least one of said metal sheets sufficiently to melt said thermal plastic adhesive;
   applying pressure to said heated laminate so as to cause said metal sheets to adhere;
   subsequently coiling said laminate on a mandrel under tension of not less than one thousand pounds per square inch of laminate cross-section;
   removing said coiled laminate from said mandrel and clamping said coiled laminate radially to prevent relative movement of the coil convolutions;
   applying sufficient heat to the interior of said coil to maintain the coolest convolution of said coil at a predetermined temperature for a predetermined period, thereby effecting curing of said laminate; and
   at the end of said predetermined period terminating the application of said heat to the interior of said coil and permitting said coil to cool progressively to ambient temperature from the outer coil layers inwards, whereby bonding strength between said metallic layers is optimized.

2. The method of claim 1, wherein said mandrel is initially at a temperature of at least 25°C lower than that of said laminate immediately prior to coiling said laminate on said mandrel.

3. The method of claim 1, further comprising the step of coating the interior of said laminate coil with a heat absorbing agent prior to applying heat to the interior of said coil.

4. The method of claim 1, further comprising the step of maintaining the temperature at each point of a given convolution of said laminate coil at substantially the same temperature as that of every other point of said given convolution.

5. The method of claim 1, further comprising the step of applying a heat insulating covering to the exterior of said coil prior to applying heat to the interior of said coil, said covering extending over the end portion of said coil.

6. The method of claim 5, further comprising the step of maintaining said heat insulating covering over the ends of said coil after stopping the application of heat to the interior of said coil so that said cooling of said coil from the outer laminate layers inwards will be substantially uniform along the length of said coil.

7. The method of claim 1, wherein said predetermined temperature for curing said laminate is not less than 125°C nor greater than 340°C.

8. The method of claim 7, wherein said predetermined period is related to said predetermined temperature by a curve which is substantially asymptotic to a pair of rectilinear coordinates comprising said predetermined period and said predetermined temperature respectively, said predetermined period being at a maximum when said predetermined temperature is at 125°C and at a minimum when said predetermined temperature is at 340°C.

9. The method of claim 1 wherein said ambient temperature is not greater than 100°C.

* * * * *